United States Patent [19]

Hibino et al.

[11] 4,454,726
[45] Jun. 19, 1984

[54] CONTROL DEVICE OF ABSORPTION TYPE COLD AND WARM WATER SYSTEM

[75] Inventors: Yozo Hibino; Kohji Kamejima, both of Ibaraki; Yasuaki Nara, Tsuchiura, all of Japan

[73] Assignee: Hitachi, Ltd., Tokyo, Japan

[21] Appl. No.: 454,029

[22] Filed: Dec. 28, 1982

[30] Foreign Application Priority Data

Jan. 6, 1982 [JP] Japan ................................. 57-318
Jan. 6, 1982 [JP] Japan ................................. 57-319
May 28, 1982 [JP] Japan ................................. 57-89644

[51] Int. Cl.³ ........................................... F25B 15/00
[52] U.S. Cl. ................................................. 62/148
[58] Field of Search ..................................... 62/148

[56] References Cited

U.S. PATENT DOCUMENTS 3,002,359 10/1961 Miner .................................. 62/148
3,426,548 2/1969 Greacen et al. ................. 62/148 X
4,090,372 5/1978 Lamb ............................... 62/148 X Primary Examiner—Lloyd L. King
Attorney, Agent, or Firm—Antonelli, Terry & Wands

[57] ABSTRACT

In an absorption type cold and warm water system, a solution pump and a refrigerant pump are operated when a heat source serving as a drive source of the absorption type cold and warm water system is rendered inoperative as a result of the temperature of cold water and warm water produced by the system reaching an OFF value set beforehand for the heat source. This enables refrigerating and heating abilities stored in the cold and warm water system to be effectively utilized.

8 Claims, 8 Drawing Figures

CONTROL DEVICE OF ABSORPTION TYPE COLD AND WARM WATER SYSTEM

BACKGROUND OF THE INVENTION (1) Field of the Invention

This invention relates to a control device of an absorption type cold and warm water system.

(2) Description of the Prior Art

An absoprtion type cold and warm water system generally comprises generators, a condenser, an evaporator, an absorber and heat exchangers. One type of a drive source for this absorption type cold and warm water system utilizes, as described in Japanese Patent Application Laid-Open No. 87752/81, for example, heat of combustion of gas, kerosene, etc. Another type utilizes solar heat in combination with the heat of combustion of gas, kerosene, etc.

In an absorption type cold and warm water system provided with a drive source of the former type, when cold water is produced, control of the temperature of the cold water is effected by adjusting the heat source in a manner to keep the temperature of the cold water at a predetermined temperature level. In controlling the adjustments of the heat source, on-off control or proportional control is adopted. In the on-off control, heating is started at a time when the temperature of the cold water reaches the uppermost level and heating is stopped at a time when it reaches the lowermost level. In the proportional control, the amount of heat produced by heating is continuously controlled in accordance with the difference between the current temperature of the cold water and the lowermost level of its temperature.

In effecting on-off control or proportional control of the heat source, it has hitherto been usual practice only to effect adjustments of the heat source to keep the temperature of the cold water at a predetermined value. However, in actual practice, the amount of heat produced by heating causes a change in the temperature and concentration of a solution in the generators. This is transmitted through the flow of the solution and causes an absorption action of the solution in the absorber and an evaporation action of a refrigerant in the evaporator to occur, thereby causing the temperature of the cold water to drop. Stated differently, even if heating is stopped when the temperature of the cold water drops, the generators, the absorber and the evaporator constituting an absorption type cold and warm water system possess a very high refrigerating ability and prevent the temperature of the cold water that have dropped from rising again at once.

In an absorption type cold and warm water system provided with a drive source of the latter type, when it is intended to produce cold water, the temperature of the cold water is kept at a predetermined value by starting and stopping the operation of a pump for feeding low temperature warm water heated by solar heat and effecting adjustments of an auxiliary heating source relying on the combustion of fuel, such as kerosene or gas. When the temperature of the cold water drops below the predetermined value as a result of the operation of these heat sources, the heat sources are rendered inoperative. However, the generators, the absorber and the evaporator constituting an absorption type cold and warm water system have such a high refrigerating ability that at this time the amount of heat of a heat medium possessed by the generators, for example, prevent the temperature of the cold water from rising at once.

Moreover, in an absorption type cold and warm water system having the drive source of the latter type, when it is intended to produce warm water, the temperature of the warm water is kept at a predetermined value by starting and stopping the operation of a pump for feeding the warm water heated by solar heat and adjusting a heating source relying on the combustion of fuel, such as kerosene or gas. When the temperature of the warm water rises to a level above the predetermined value, the heat sources are rendered inoperative. However, the generators, the absorber and the evaporator constituting an absorption type cold and warm water system has such a high heating ability that at this time the amount of a heat medium possessed by the generators, for example, prevent the temperature of the warm water from dropping at once.

In fact, such high refrigerating and heating abilities as possessed by an absorption type cold and warm water system as described hereinabove have not hitherto been effectively utilized.

SUMMARY OF THE INVENTION (1) Objects of the Invention

An object of this invention is to provide a control device of an absorption type cold and warm water system enabling refrigerating and heating abilities accumulated in the cold and warm water system to be effectively utilized.

Another object is to provide a control device of an absorption type cold and warm water system capable of avoiding consumption, which is more than necessary, of the heat produced by heating serving as a drive source of the absorption type cold and warm water system.

Still another object is to provide a control device of an absorption type cold and warm water system capable of effectively utilizing the heat of warm water produced by heating water by solar heat.

(2) Statement of the Invention

The outstanding characteristic of the invention enabling the aforesaid objects to be accomplished is that the solution pumps and the refrigerant pump are operated even when the heat sources serving as a drive source of the absorption type cold and warm water system is rendered inoperative, to enable full use of the refrigerating and heating abilities stored in the cold and warm water system to be realized.

Additional and other objects, features and advantages of the invention will become apparent from the description set forth hereinafter when considered in conjunction with the accompanying drawings.

DETAILED DESCRIPTION OF THE PREFERRED EMBODIMENTS

Preferred embodiments of the control device of an absorption type cold and warm water system in conformity with the invention will now be described by referring to the accompanying drawings.

Figure 1:
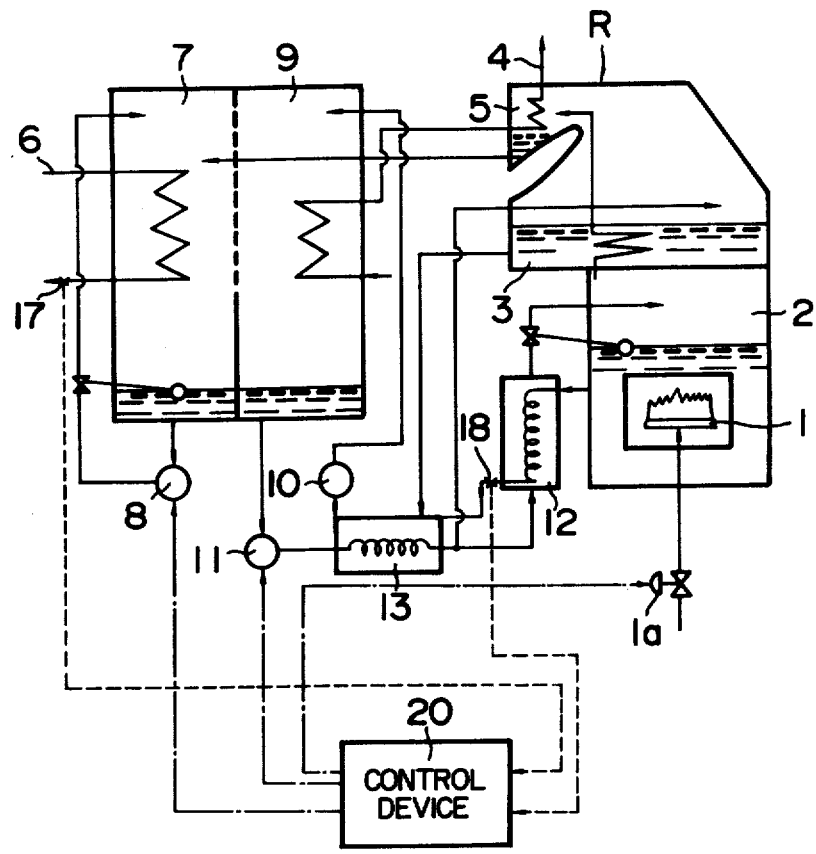
FIG. 1 is a view of an absorption type cold and warm water system provided with one embodiment of the control device in conformity with the invention, showing the construction of the system as used for producing cold water.

FIG. 1 is a systematic view of an absorption type cold and warm water system provided with one example of the control device according to the invention. The cold and warm water system R is of the two stage type comprising a heat source 1 for heating a heating medium, a high temperature generator 2 for heating a dilute solution with the heating medium heated by the heat source 1 for generating a refrigerant vapor (water vapor), a low temperature generator 3 for heating a dilute solution with the refrigerant vapor produced by the high temperature generator 2 to produce a refrigerant vapor (water vapor), a condenser 5 for cooling with cooling water flowing through a cooling water tube 4 the refrigerant vapor produced by the high and low temperature generators 2 and 3 to change same to a liquid state, an evaporator 7 for evaporating the refrigerant in a liquid state obtained by the condenser 5 and obtaining the latent heat of vaporization from water flowing through a cold water tube 6 for producing cold water, a refrigerant circulating pump 8 for circulating a refrigerant through the evaporator 7, an absorber 9 for producing a dilute solution by causing the refrigerant vapor produced by the evaporator while being cooled by the cooling water flowing through the cooling water tube 4 to be absorbed by a concentrated solution introduced thereinto from the generators 2 and 3, a solution spray pump 10 for feeding the concentrated solution under pressure to the absorber 9 from the generators 2 and 3, a solution pump 11 for feeding under pressure the dilute solution produced by the absorber 9 to the generators 2 and 3, a heat exchanger 12 for high temperature liquid to enable heat exchange to take place between the concentrated solution of high temperature returned from the high temperature generator 2 to the absorber 9 and the dilute solution of low temperature supplied from the absorber 9 to the high temperature generator 2, and a heat exchanger 13 for low temperature liquid to enable heat exchange to take place between the concentrated solution of high temperature returned from the generators 2 and 3 to the absorber 9 and the dilute solution of low temperature supplied from the absorber 9 to the generators 2 and 3.

A temperature sensor 17 senses the temperature of cold water flowing through the cold water tube 6. A temperature sensor 18 is interposed between the two heat exchangers 12 and 13 to sense the temperature of the solution. The numeral 20 designates a control device operative to control the heating source 1 based on a signal supplied from the temperature sensor 17 as a result of sensing the temperature of the cold water flowing through the cold water tube 6 to keep the temperature of the cold water to a predetermined level and to control the solution pumps 10 and 11 and refrigerant pump 3 based on a signal supplied from the temperature sensor 18 as a result of sensing the temperature of the solution flowing between the two heat exchangers 12 and 13.

In the absorption type cold and warm water system of the aforesaid construction, the heat source 1 is subjected to on-off control or proportional control so as to control the temperature of the cold water to a predetermined temperature level. To begin with, the control device according to the invention will be described as being incorporated in an absorption type cold and warm water system subjected to on-off control.

Figure 2:
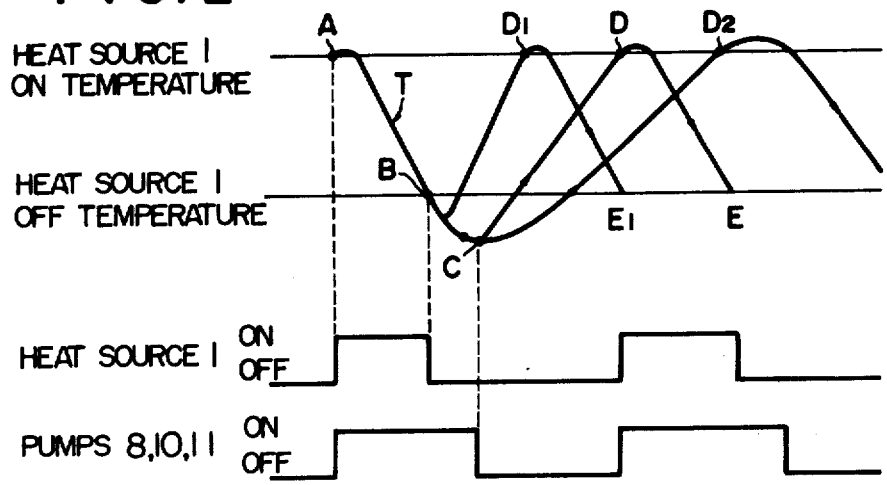
FIG. 2 is a time chart in explanation of the operation of the control device shown in FIG. 1 according to the invention.

FIG. 2 is a time chart showing the pattern of operation of the control device according to the invention which effects on-off control. When on-off control is effected, the heat source 1 is turned on when the cold water temperature T reaches its upper limit and at the same time the pumps 8, 10 and 11 are actuated. This causes the cold water temperature T to gradually drop, and when the temperature T reaches its lower limit the heat source 1 is turned off. By repeating this process, it is possible to control the cold water temperature T within a predetermined temperature range. As shown in FIG. 1, a large amount of heat medium is existing between the heat source 1 and the cold water tube 6, so that even if the heat source 1 is turned off a high refrigerating ability is accumulated therein. It has hitherto been customary to actuate the pumps 8, 10 and 11 and operate same in accordance with the temperature of the solution in a predetermined position until the temperature of the solution drops to a level below a predetermined value as shown in FIG. 1, after the heat source 1 is turned off. In this system, if the pumps 8, 10 and 11 are immediately rendered inoperative following interruption of the operation of the heat source 1, then the refrigerating ability of the cold and warm water system becomes zero, so that the cold water temperature immediately rises from point B to point $D_1$ in FIG. 2. This results is not only the aforesaid high refrigerating ability possessed by the cold and warm water system not being effectively utilized but also excessive energy being wasted because of an increase in the frequency of heating in effecting on-off control. In another system, the pumps 8, 10 and 11 are operated without depending on the solution temperature. In this system, the pumps 8, 10 and 11 remain operative even after the heat source 1 is turned off, so that the aforesaid high refrigerating ability is effectively utilized and the cold water temperature slowly drops from point B to point C and then rises to point $D_2$ as shown in FIG. 2. However, if the operation of the pumps 8, 10 and 11 is continued without heating, then the concentration of the solution becomes markedly low. This causes the time required for keeping the heat source 1 on next time to be prolonged, resulting in consumption of excessive energy. To obviate the aforesaid disadvantages of the prior art, the control device 20 according to the invention operates such that after the heat source 1 is turned off, the pumps 8, 10 and 11 are operated until the temperature of the solution in a position midway between the two heat exchangers 12 and 13 as sensed by the temperature sensor 18 drops to a level below a predetermined value and the operation of the pumps 8, 10 and 11 is continued while the temperature of the cold water keeps dropping on account of the operation of the pumps 8, 10 and 11. This enables the aforesaid high refrigerating ability to be effectively utilized and the temperature of the cold water drops from point B to point C in FIG. 2. Since the cold water temperature does not drop to a level below point C, the pumps 8, 10 and 11 become inoperative. This causes the temperature of the cold water to rise immediately from point C to point D but the solution shows no reduction in concentration. Moreover the time during which the heating source 1 is kept on is more or less the same in duration as has hitherto been the case, enabling the energy to be effectively utilized. The point in time at which the cold water temperature does not drop is determined by sensing the occurrence of no change in the temperature of the cold water at two points in time of very short intervals. For practical purposes, the end is attained by sensing that the difference in cold water temperature between the two points in time drops below a predetermined small value. To be more exact, said lowest point is decided by sensing that the differentiated value of the cold water temperature at each point in time becomes zero or below a predetermined small value. From the point of view of the safety of operation, the aforesaid system of the prior art of operating the pumps 8, 10 and 11 is preferably used in combination with the operation of the control device 20 according to the invention in accordance with the temperature of the solution in a predetermined position or until the temperature of the solution in a position midway between the two heat exchangers 12 and 13 drops to a level below a predetermined value.

In an ordinary cold and warm water system, a lower limit temperature is set for the cold water because if the temperature of the cold water drops to a very low level, it is frozen or the internal condition of the system becomes unbalanced. Thus it is necessary to interrupt the operation of the pumps according to the invention when a predetermined cold water temperature is reached before the aforesaid lower limit temperature is reached. When the load is high, the cold water temperature drops a result of the operation of the pumps according to the invention, but the cold water temperature rarely drops to the aforesaid predetermined temperature. Rather the rise in the cold water temperature caused by the pump operation makes it necessary to interrupt the operation of the pumps. When the load is low, there are possibilities that pump operation would cause the cold water temperature to drop to a substantial low level, so that it is necessary to interrupt pump operation when the predetermined cold water temperature is reached before the lower limit of cold water temperature is reached or to render the pump 8 inoperative while allowing other pumps 10 and 11 to continue operation when the cold water temperature drops, followed by interruption of the operation of the pumps 10 and 11 at the predetermined cold water temperature before the lower limit of cold water temperature is reached.

When the cold water temperature is rising, the refrigerant pump 8 may only be operated. This enables the refrigerating ability of the refrigerant to be effectively used. In this case, it is not advisable to operate the solution pumps 10 and 11 because operation of this pump merely dilutes the solution because of the absence of heating, thereby increasing the amount of heat required to be produced when heating is effected next time. Also, there are limits to the refrigerating ability possessed by the refrigerant. By taking this into consideration, operation of the refrigerant pump 8 may be interrupted when the cold water temperature shows a sudden rise.

The operation of the control device 20 according to the invention has been described by referring to on-off control. When proportional control is effected, one only has to use the temperature range between the temperature at which the heat source 1 is turned on and the temperature at which it is turned off in on-off control as a proportional zone to use the same control process as described hereinabove. The control device 20 may be in the form of an electronic circuit or a microcomputer.

As described hereinabove, according to the embodiment of the invention shown and described hereinabove, it is possible to reduce the frequency of heating in on-off control and to reduce the amount of heat required to be produced by heating in proportional control. This is conductive to marked energy conservation. Also prolonged holding of the cold water temperature near its lower limit temperature level uniformizes the cooling ability, thereby increasing the comfort enjoyed by those in the cooled space.

Figure 3:
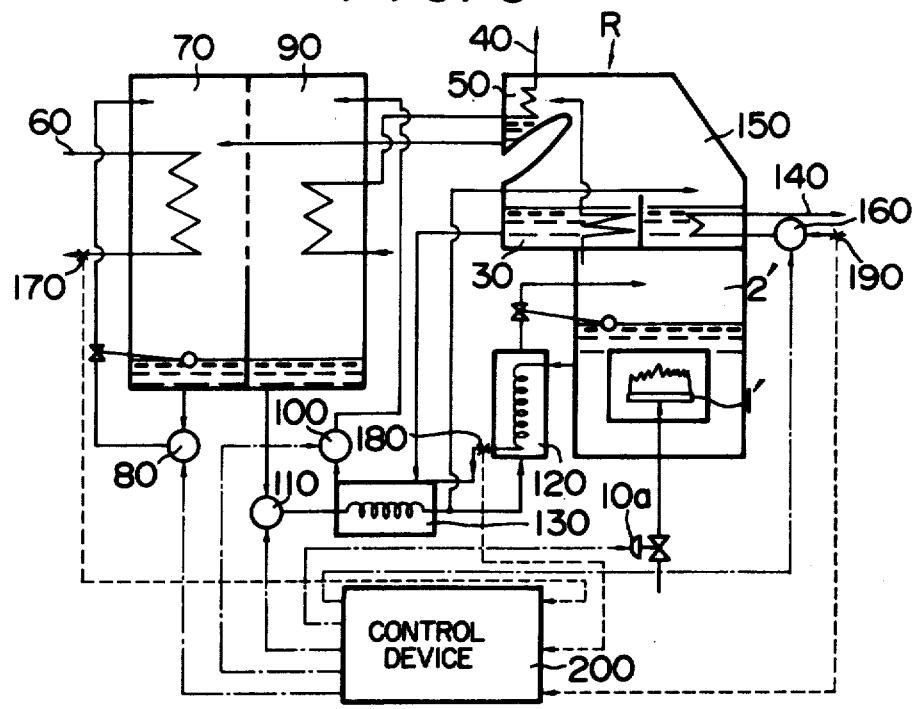
FIG. 3 is a view of an absorption type cold and warm water system utilizing solar heat provided with another embodiment of the control device in conformity with the invention, showing the construction of the system as used for producing cold water.

FIG. 3 shows in a systematic view of an absorption type cold and warm water system utilizing solar heat incorporating another embodiment of the invention. As shown, the cold and warm water system R which is of two stage type comprises an auxiliary heat source 1' for heating a dilute solution, a high temperature generator 2' for generating refrigerant vapor (water vapor) from the heated dilute solution, a low temperature generator 30 for generating refrigerant vapor (water vapor) by heating a dilute solution with the refrigerant vapor produced by the high temperature generator 2', a condenser 50 for cooling the refrigerant vapor produced by the two generators 2' and 30 with cooling water flowing through a cooling water tube 40 to change same to a liquid state, an evaporator 70 for evaporating the refrigerant in a liquid state obtained by the condenser 50 by condensation and obtaining the latent heat of vaporization from water flowing through a cold water tube 60 for producing cold water, a refrigerant pump 80 for the evaporator 70, an absorber 90 for producing a dilute solution by causing the refrigerant vapor produced by the evaporator while being cooled by the cooling water flowing through the cooling water tube 40 to be absorbed by a concentrated solution introduced thereinto from the generators 2' and 30, a solution spray pump 100 for feeding the concentrated solution under pressure from the generators 2' and 30 to the absorber 90, a solution pump 110 for feeding under pressure the dilute solution produced by the absorber 90 to the generators 2' and 30, a heat exchanger for high temperature 120 allowing heat exchange to take place between the concentrated solution of high temperature returned from the high temperature generator 2' to the absorber 90 and the dilute solution of low temperature fed from the absorber 90 to the high temperature generator 2', a heat exchanger 130 for low temperature allowing heat exchange to take place between the concentrated solution of high temperature returned from the generators 2' and 30 to the absorber 90 and the dilute solution of low temperature fed from the absorber 90 to the generators 2' and 30, a low temperature heat source generator 150 attached to the low temperature generator 30 for heating a dilute solution with low temperature warm water in a low temperature warm water tube 140 heated by solar heat to generate refrigerant vapor, and a low temperature warm water pump 160 for feeding the low temperature warm water under pressure to the low temperature heat source generator 150. A temperature sensor 170 senses the temperature of cold water in the cold water tube 60, and a temperature sensor 180 senses the temperature of a concentrated solution in a position midway between the two heat exchangers 120 and 130. A temperature sensor 190 senses the temperature of low temperature warm water in the low temperature warm water tube 140. A control device 200 is operative to control a heating control valve 10a of the heat source 1' and the low temperature warm water pump 160 based on signals produced by the temperature sensors 170 and 190 for controlling the temperature of the cold water to a predetermined level and to control the refrigerant pump 80, solution spray pump 100 and solution pump 110 based on a signal produced by the temperature sensor 180 for controlling the solution temperature to a predetermined level.

Operation of the control device 200 referred to hereinabove will be described by referring to FIG. 4.

Figure 4:
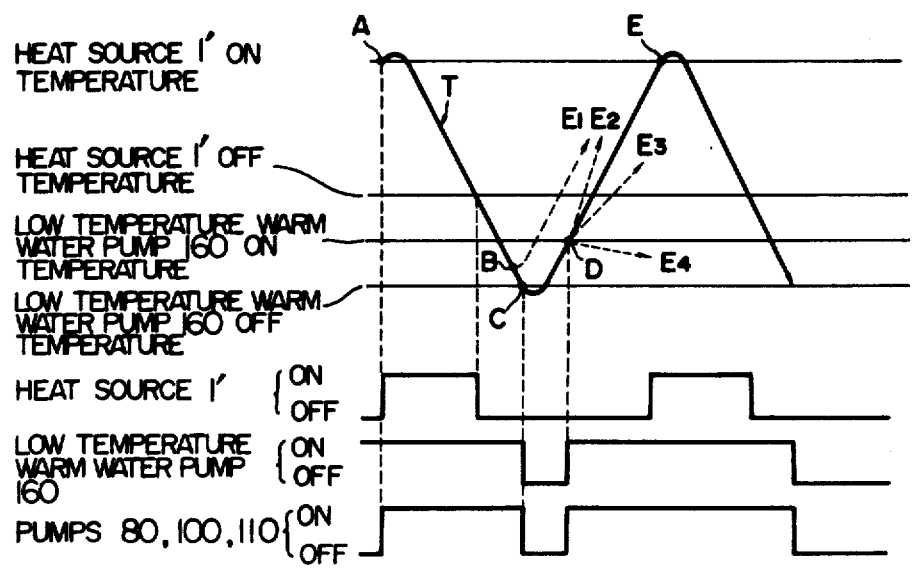
FIG. 4 is a time chart in explanation of one example of the operation of the control device shown in FIG. 3 according to the invention.

FIG. 4 is a time chart showing an operation pattern of the control device 200 for controlling the low temperature warm water pump 160 and the auxiliary heat source 1' by on-off control. In on-off control, the auxiliary heat source 1' is turned on when cold water temperature reaches an ON temperature value and at the same time the pumps 80, 100 and 110 are actuated. When the cold water temperature drops to an OFF temperature value of the heat source 1', then the auxiliary heat source 1' is turned off. Meanwhile when low temperature warm water produced by heating the cold water with solar heat has a high heating ability, the low temperature warm water pump 160 is actuated to introduce the low temperature warm water to the low temperature heat source generator 150. When this further reduces the cold water temperature to a level equal to the OFF temperature value of the low temperature warm water pump 160, the low temperature warm water pump 160 is deactuated. Thereafter when the cold water temperature rises to an ON temperature value of the low temperature warm water pump 160, the low temperature warm water pump 160 is actuated.

In controlling the low temperature warm water pump 160 and the auxiliary heat source 1' in accordance with the time chart shown in FIG. 4, since a large amount of heat medium is present between the heat source 1' or the low temperature warm water tube 140 and the cold water tube 60 as shown in FIG. 3, a high refrigerating ability is accumulated therein even if the heat source 1' is turned off. It has hitherto been usual practice to operate the pumps 80, 100 and 110, after the heat source 1' is turned off, in accordance with the concentration of a solution in a predetermined position until the temperature of the solution in a position midway between the two heat exchangers 120 and 130 drops below a predetermined value, as shown in FIG. 3. When this operation pattern is followed, the cold and warm water system loses its refrigerating output in spite of the low temperature warm water being fed, if the pumps 80, 100 and 110 are deactuated immediately after the heat source 1' is turned off. This causes the cold water temperature to rise from point B straight to point $E_1$ as indicated by a broken line in FIG. 4. If, therefore, the pumps 80, 100 and 110 are deactuated at this time, a high refrigerating ability possessed by the cold and warm water system is not effectively utilized, and solar heat is not effectively utilized. In this pattern of operation, assume that the low temperature warm water produced by heating water with solar heat has a high heating ability. Also assume that the cold water temperature reaches the OFF temperature of the low temperature warm water pump 160 and the low temperature warm water pump 160 is deactuated, and thereafter the cold water temperature rises to reach the ON temperature of the low temperature warm water pump 160, to thereby actuate the low temperature warm water pump 160. When this is the case, if the pumps 80, 100 and 110 are inoperative, the low temperature warm water obtained by heating water with solar heat is not utilized as a refrigerating output of the cold and warm water system. Thus the cold water temperature immediately rises from point D to point $E_2$ as shown by a broken line in FIG. 4, without the solar heat being effectively utilized.

In view of the operation pattern of the prior art described hereinabove, the control device 200 according to the invention is operative to actuate the pumps 80, 100 and 110 after the heat-source 1' is turned off and continue the pump operation until the temperature of the solution sensed in a predetermined position by the temperature sensor 180 drops below the predetermined value, and also to operate the low temperature warm water pump 160 while the low temperature warm water obtained by heating water with solar heat still has a high heating ability, to introduce the low temperature warm water into the low temperature heat source generator 150 while keeping the pumps 80, 100 and 110 in operation. This enables solar heat to be effectively utilized, thereby causing the cold water temperature to drop from point B to point C as indicated by a solid line in FIG. 4. When the cold water temperature reaches the OFF temperature value of the low temperature warm water pump 160, the low temperature warm water pump 160 is rendered inoperative. Thereafter when the cold water temperature rises from point C to point D and reaches the ON temperature of the low temperature warm water pump 160, the low temperature warm water pump 160 is actuated. At this time, the pumps 80, 100 and 110 are also actuated. This enables the solar heat to be effectively used, so that the cold water temperature slowly rises from point D to point E. Particularly when the solar heat is abundant and the low temperature warm water has a high heating ability and the load is low, it is possible to prevent the cold water temperature from rising by feeding the low temperature warm water and operating the pumps 80, 100 and 110. Thus the cold water temperature is slowly raised from point D to point $E_3$ or lowered to point $E_4$ merely by the refrigerating output of the solar heat and makes it possible to reduce the amount of heat produced by the auxiliary heat source 1'.

Figure 5:
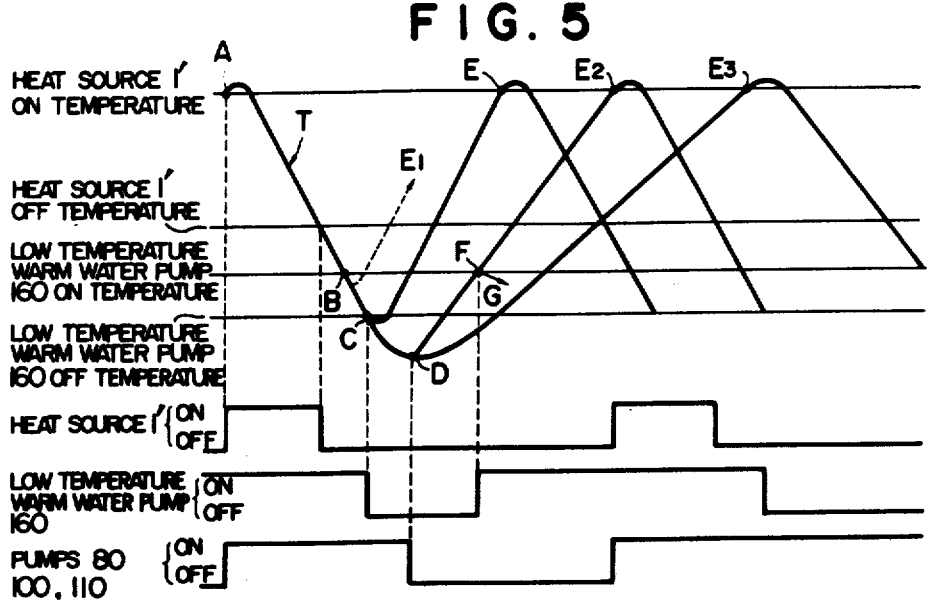
FIG. 5 is a time chart in explanation of another example of control operation of the control device shown in FIG. 3.

FIG. 5 is a time chart in explanation of the control operation performed by another embodiment of the control device in conformity with the invention.

Generally the amount of heat produced by the solar heat is smaller than the amount of heat produced by the auxiliary heat source 1'. Depending on the conditions of the solar heat and the load, the temperature of the solution may be reduced to a very low level if the operation of the pumps 80, 100 and 110 is continued, even if the solar heat is utilized. This might prolong the time during until the heating source 1' is turned on next time, thereby increasing the consumption of energy. To cope with this situation, the pumps 80, 100 and 110 are operated according to the invention after the heat source 1' is turned off until the temperature of the solution becomes below a predetermined value. At the same time, if the temperature of the cold water drops as a result of introduction of low temperature warm water into the low temperature heat source generator 150 by operating the low temperature warm water pump 160 when the low temperature warm water produced by heating water by the solar heat has a high heating ability, the pumps 80, 100 and 110 are actuated. By this arrangement, effective utilization of the solar heat is made possible if the low temperature warm water has a high heating ability as aforesaid, so that the cold water temperature drops to point C from point B. As a result, the control device 200 renders the low temperature warm water pump 160 inoperative as the cold water temperature reaches the OFF temperature of the low temperature warm water pump 160. However, if the cold water temperature drops thereafter with the operation of the pumps 80, 100 and 110, then the pumps 80, 100 and 110 continue operation. Thus the high refrigerating ability can be effectively utilized, and the cold water temperature drops from point C to point D. Since the cold water temperature does not drop below point D, the control device 200 renderes the pumps 80, 100 and 110 inoperative based on this change in temperature. Thereafter, the cold water temperature rises from point D to point F, but the solution never shows a reduction in concentration.

If the cold water temperature rises to point F and reaches the ON temperature of the low temperature warm water pump 160 while the low temperature warm water has a high heating ability, then the low temperature warm water pump 160 is actuated. In this case, if the cold water temperature drops from point F to point G with the operation of the pumps 80, 100 and 110, the pumps 80, 100 and 110 are actuated to make effective utilization of the solar heat. However, when the cold water temperature does not drop and rises from point F to point E$_2$ even if the pumps 80, 100 and 110 are operated, the pumps 80, 100 and 110 are rendered inoperative. This causes the cold water temperature to rise and reduce the time during until the auxiliary heat source 1' is turned on next time, thereby contributing to conservation of energy.

Alternatively, the pumps 80, 100 and 110 may be operated without depending on the temperature of the solution. When this is the case, the pumps 80, 100 and 110 are operated even after the heat source 1' and the low temperature warm water pump 160 are turned off. This enables a high refrigerating ability to be effectively utilized as aforesaid, and the cold water temperature gently drops from point B to point C and point D and then rises to point E$_3$. However, if operation of the pumps 80, 100 and 110 is continued without heating, the concentration of the solution drops to a very low point and the time during until the heating source 1' is required to be turned on is prolonged, causing an increase in the consumption of the heating source 1'.

The embodiment shown and described hereinabove refers to on-off control. When proportional control is effected, one only has to use the temperature range between the temperature at which the heat source 1' or the low temperature warm water pump 160 is turned on and the temperature at which it is turned off in on-off control as a proportional zone to use the same control process as described hereinabove. Also, in the aforesaid description, reference has been made to the cold water temperature T in relation to turning on and off of the heating source 1' and the low temperature warm water pump 160 as shown in FIGS. 4 and 5. However, it is not essential how this relation is established as described by referring to the preceding embodiment. The control device 200 may be in the form of an electronic circuit or a microcomputer.

From the foregoing description, it will be appreciated that the embodiment of the invention shown and described hereinabove enables the solar heat to be effectively utilized for producing cold water. This is conducive to marked energy conservation by reducing the consumption of the auxiliary heat source 1'.

Figure 6:
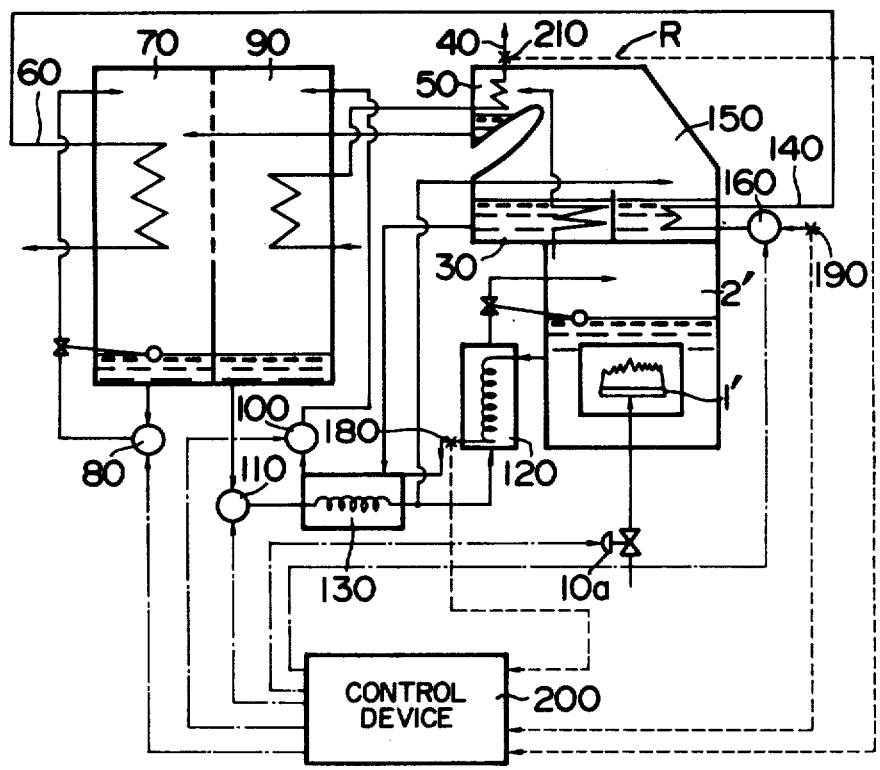
FIG. 6 is a view of an absorption type cold and warm water system utilizing solar heat provided with still another embodiment of the control device, showing the construction of the system as used for producing warm water.

FIG. 6 is a systematic view of an absorption type cold and warm water system utilizing solar heat provided with still another embodiment of the control device in conformity with the invention. By passing a low temperature warm water through the cold water tube 60 shown in FIG. 3, it is possible to use the system as a heat pump type cold and warm water system obtaining warm water through the cooling water tube 40. In FIG. 6, parts similar to those shown in FIG. 3 are designated by like reference characters.

In the cold and warm water system R shown in FIG. 6, low temperature warm water is passed through the evaporator 70 to produce water vapor. Warm water is produced by the heat of absorption generated when a solution absorbs the water vapor and the heat of condensation generated by the low temperature warm water passed through the main heat source 1' or the low temperature heat source generator 150.

The temperature of warm water in the warm water tube 40 is sensed by a temperature sensor 210. Another temperature sensor 180 senses the temperature of a concentrated solution in a position midway between the two heat exchangers 120 and 130. Still another temperature sensor 190 senses the temperature of low temperature warm water in the low temperature warm water tube 140. A control device 200 is operative to effect control of the heating control valve 10$a$ of the heat source 1' and the low temperature warm water pump 160 to control the cold water temperature to a predetermined value based on signals issued by the temperature sensors 170 and 190 and control of the refrigerant pump 80, solution spray pump 100 and solution pump 110 to control the solution temperature to a predetermined value based on a signal produced by the temperature sensor 180.

Operation of the control device 200 referred to hereinabove will be described by referring to FIG. 7.

Figure 7:
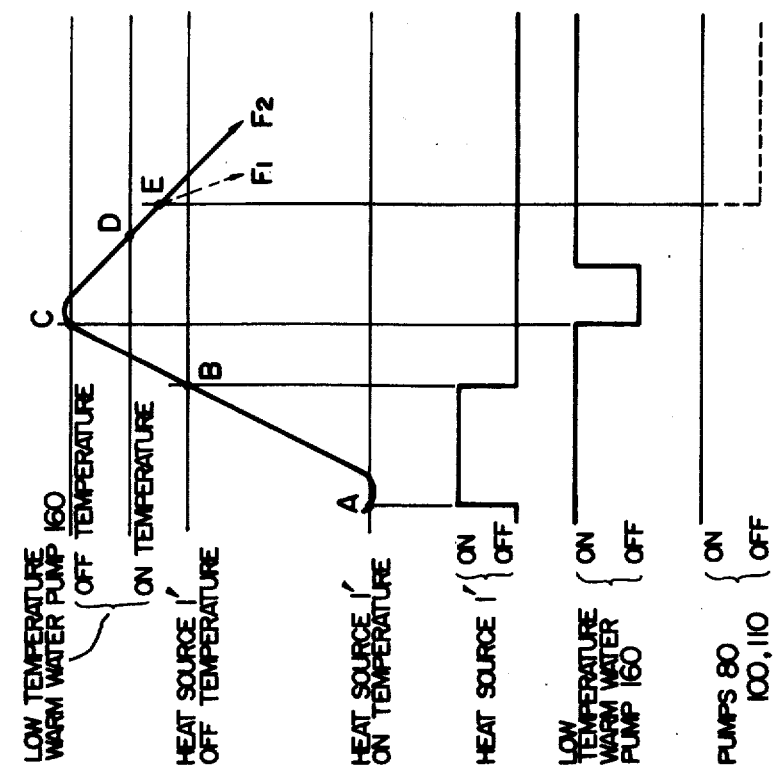
FIG. 7 is a time chart in explanation of one example of the operation of the control device shown in FIG. 6 according to the invention.

FIG. 7 is a time chart showing an operation pattern of on-off control effected with regard to the heat source 1' and low temperature warm water pump 160. In on-off control, the heat source 1' is turned on when the warm water temperature reaches its lower limit value and turned off when it reaches its upper limit value. Meanwhile when the low temperature warm water produced by heating cold water with solar heat has a high heating ability, the low temperature warm water pump 160 is actuated to pass the low temperature warm water to the evaporator 70. When on-off control of the heat source 1' and low temperature warm water pump 160 is effected in accordance with the time chart shown in FIG. 7, a large amount of heat medium exists as shown in FIG. 6 between the heat source 1' or the low temperature warm water tube 60 and the warm water tube 40, so that even if the heat source 1' is turned off the system possesses a high warm water producing ability stored therein. It has hitherto been usual practice to operate the pumps 80, 100 and 110, after the heat source 1' is turned off, in accordance with the temperature of a solution in a predetermined position until, for example, the temperature of the solution in a position midway between the two heat exchangers 120 and 130 drops below a predetermined value as shown in FIG. 6. When this is the case, if the pumps 80, 100 and 110 are rendered inoperative at point C after the heat source 1' is turned off at point B, no output is available for the heat pump in spite of the low temperature warm water being passed to the evaporator 70, so that the warm water temperature suddenly drops from point C to point $D_1$. Stated differently, deactuation of the pumps 80, 100 and 110 makes it impossible to make effective use of not only the high warm water producing ability possessed by the heat pump but also the solar heat.

To obviate the aforesaid disadvantages of the prior art, the embodiment of the control device in conformity with the invention lets the pumps 80, 100 and 110 continue operation after the heat source 1' is turned off until the temperature of the solution sensed by the temperature sensor 180 drops below a predetermined value while allowing the pumps 80, 100 and 110 to operate while low temperature warm water is passed to the evaporator 70 by actuating the low temperature warm water pump 160. This makes it possible to make effective use of the solar heat in producing an output and causes the temperature of the warm water to gently drop from point C to point $D_2$. Particularly when the solar heat is available in abundance and the low temperature warm water has a high heating ability while the load is rather low, it is possible to suppress a drop in the temperature of the warm water by passing the low temperature warm water to the evaporator 70 and actuating the pumps 80, 100 and 110.

Figure 8:
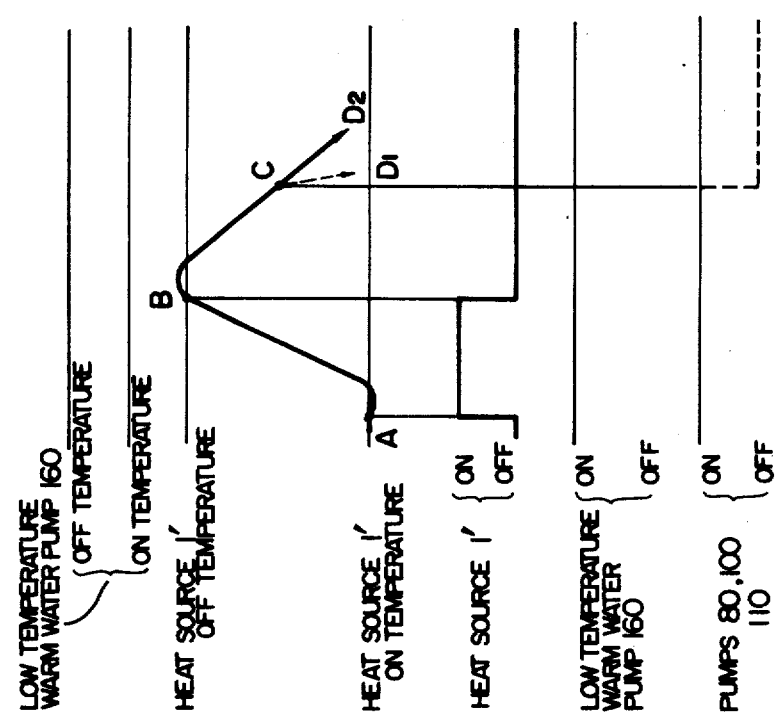
FIG. 8 is a time chart in explanation of another example of the operation of the control device shown in FIG. 6.

FIG. 8 is a time chart in explanation of another example of control operation performed by the embodiment of the control device in conformity with the invention shown in FIG. 6. In on-off control, when the temperature of low temperature warm water is high, the heat source 1' is turned off as the warm water temperature reaches its upper limit value. However, the temperature of warm water may further rise depending on the low temperature warm water. In this case, on-off control of the low temperature warm water pump 160 is effected depending on whether the warm water temperature has reached the OFF temperature and ON temperature of the low temperature warm water pump 160. It has hitherto been usual practice to continue operation of the pumps 80, 100 and 110 after the heat source 1' is turned off until the temperature of a solution in a predetermined position drops below a predetermined value. When this is the case, if the low temperature warm water pump 160 is turned off at point C after the heat source 1' is turned off at point B and the pumps 80, 100 and 110 are rendered inoperative at point E after the pump 160 is turned on again at point D, then the system lacks an output of the heat pump in spite of the low temperature warm water being passed to the evaporator. This causes the temperature of warm water to suddenly drop from point E to point $F_1$. Stated differently, deactuation of the pumps 80, 100 and 110 makes it impossible to make effective use of not only the high warm water producing ability possessed by the heat pump but also the solar heat.

To obviate the aforesaid disadvantages of the prior art, the control device according to the invention lets the pumps 80, 100 and 110 continue operation after the heat source 1' is turned off until the temperature of the solution sensed by the temperature sensor 180 drops below a predetermined value while allowing the pumps 80, 100 and 110 to operate when low temperature warm water is passed to the evaporator 70 by actuating the low temperature warm water pump 160. This makes it possible to make effective use of the solar heat in producing an output and causes the temperature of the warm water to gently drop from point E to point $F_2$. Particularly when the solar heat is available in abundance and the low temperature warm water has a high heating ability while the load is rather low, it is possible to suppress a drop in the temperature of the warm water by passing the low temperature warm water to the evaporator 70 and actuating the pumps 80, 100 and 110.

In the embodiment shown in FIGS. 7 and 8, the pumps 80, 100 and 110 are operated when low temperature warm water is passed to the evaporator 70. Usually the amount of heat produced by the solar heat is smaller than that produced by the heat source 1'. Thus depending on the conditions of the solar heat and the load, the temperature of the solution may drop to a very low level if operation of the pumps 80, 100 and 110 is continued even if the low temperature warm water is passed to the evaporator 70. This prolongs the time during until the heat source 1' is required to remain ON next time, thereby making it inevitable to consume excessive energy. To cope with this situation, in another example of control operation performed by the control device 200, the pumps 80, 100 and 110 may be operated after the heat source 1' is turned off until the temperature of a solution in a predetermined position drops below a predetermined value and the pumps 80, 100 and 110 may be operated when the temperature of the warm water is raised by the low temperature warm water being passed to the evaporator 70. When this process is used, it is possible to make effective use of a high ability of the low temperature warm water if such ability exists and also to avoid a reduction in the temperature and concentration of the solution. This is conducive to shortening the time during until the heat source 1' is required to be kept ON next time when the warm water temperature drops and to a reduction in fuel consumption.

The embodiment shown and described hereinabove refers to on-off control. When proportional control is effected, one only has to use the temperature range between the temperature at which the heat source 1' is turned on or the low temperature warm water pump 160 is turned on and the temperature at which it is turned off in on-off control as a proportional zone to use the same control process as described hereinabove. Also, in the aforesaid description, reference has been made to the warm water temperature in relation to turning on and off of the heat source 1' and the low temperature warm water pump 160 as shown in FIGS. 7 and 8. It is not essential how this relation is established. The control device 200 described hereinabove may be in the form of an electronic circuit or a microcomputer.

From the foregoing description, it will be appreciated that the invention makes it possible to make the most of the solar heat in producing warm water while minimizing the consumption of the auxiliary heat source, thereby contributing to energy conservation.

This invention can also have application in an absorption type cold and warm water system of single stage.

What is claimed is:

1. A control device for controlling a heat source of an absorption type cold and warm water system to thereby control the temperature of cold water and warm water produced by the cold and warm water system to a predetermined value, comprising:
    a cold water and warm water temperature sensor for sensing the temperature of the cold water and warm water in a cold water and warm water tube produced by the cold and warm water system;
    a solution temperature sensor for sensing the temperature of a concentrated solution in the cold and warm water system, and
    a control section operative to effect control of the heat source in accordance with a signal produced as a result of the sensing performed by said cold water and warm water temperature sensor to keep the temperature of the cold water and warm water at a predetermined level and to produce operation signals for a refrigerant pump of an evaporator and a solution pump for feeding the solution to a generator under pressure in accordance with a drop and a rise in the temperature of the solution as sensed by said solution temperature sensor and a drop in the temperature of the cold water and a rise in the temperature of the warm water as sensed by said cold water and warm water temperature sensor after said heat source is turned off.

2. A control device of an absorption type cold and warm water system as claimed in claim 1, wherein said solution temperature sensor senses the temperature of the concentrated solution intermediate between two heat exchangers in which heat exchange takes place between a concentrated solution of high temperature returned from the generator to an absorber and a dilute solution of low temperature fed from the absorber to the generator.

3. A control device of an absorption type cold and warm water system as claimed in claim 1 or 2, wherein said control section produces operation signals for the refrigerant pump and the solution pump until the differential values of the temperature of the cold water that is dropping and warm water that is rising as sensed by the cold water and warm water temperature sensor becomes to be below predetermined values.

4. A control device of an absorption type cold and warm water system as claimed in claim 1 or 2, wherein said control section produces an operation signal for the refrigerant pump when the temperature of the cold water as sensed by the cold water and warm water temperature sensor is rising.

5. A control device of an absorption type cold and warm water system for controlling the temperature of cold water and warm water produced by the cold and warm water system to a predetermined value by adjusting heat sources comprising a main heat source in the form of low temperature warm water produced by heating water with solar heat and an auxiliary heat source using vapor or fuel, comprising:
    a cold water and warm water temperature sensor for sensing the temperature of cold water and warm water in a cold water and warm water tube produced by said cold and warm water system;
    a low temperature warm water temperature sensor for sensing the temperature of the low temperature warm water flowing through a low temperature warm water tube serving as the main heat source;
    a solution temperature sensor for sensing the temperature of a concentrated solution in the cold and warm water system; and
    a control section operative to produce an operation signal for the heat source and a low temperature warm water pump in accordance with signals produced by the cold water and warm water temperature sensor and the low temperature warm water temperature sensor to keep the temperature of cold and warm water at a predetermined value and produce an operation signal to a solution pump and a refrigerant pump in accordance with the temperature of the solution sensed by the solution temperature sensor when the auxiliary heat source remains inoperative and produce an operation signal to a solution pump and a refrigerant pump in accordance with an operation of a low temperature warm water pump.

6. A control device of an absorption type cold and warm water system as claimed in claim 5, wherein said control section is operative to stop feeding of low temperature warm water by the low temperature warm water pump and produce signals for rendering the solution pump and the refrigerant pump inoperative when the temperature of the cold water and warm water as sensed by the cold water and warm water temperature sensor reaches a predetermined OFF value for the low temperature warm water pump.

7. A control device of an absorption type cold and warm water system as claimed in claim 5, wherein said control section is operative to produce operation signals for the solution pump and the refrigerant pump in accordance with a drop in the cold water temperature and a rise in the warm water temperature after a stop signal is produced for the low temperature warm water pump when the temperature of the cold water and warm water as sensed by the cold water and warm water temperature sensor reaches a predetermined OFF value for the low temperature warm water pump.

8. A control device of an absorption type cold and warm water system as claimed in any of claims 5 to 7, wherein said control section produces operation signals for the low temperature warm water pump, the solution pump and the refrigerant pump when the temperature of the cold water rising from its lower value and when the temperature of the warm water dropping from its upper value as sensed by the cold water and warm water temperature sensor reaches an ON value for the low temperature warm water pump set beforehand by the cold and warm water temperature.

* * * * *